US009582190B2

United States Patent
Jedema et al.

(10) Patent No.: US 9,582,190 B2
(45) Date of Patent: Feb. 28, 2017

(54) TIME MANAGEMENT USING TIME-DEPENDENT CHANGES TO MEMORY

(71) Applicant: NXP B.V., Eindhoven (NL)

(72) Inventors: Friso Jedema, Eindhoven (NL); Jan R Brands, Nijmegen (NL); Timotheus van Roermund, Eindhoven (NL); Jan Hoogerbrugge, Helmond (NL); Piotr Polak, Eindhoven (NL)

(73) Assignee: NXP B.V., Eindhoven (NL)

( * ) Notice: Subject to any disclaimer, the term of this patent is extended or adjusted under 35 U.S.C. 154(b) by 186 days.

(21) Appl. No.: 14/276,793

(22) Filed: May 13, 2014

(65) Prior Publication Data

US 2015/0331609 A1    Nov. 19, 2015

(51) Int. Cl.
  *G06F 1/00*    (2006.01)
  *G06F 3/06*    (2006.01)
  *G06Q 20/34*    (2012.01)
  *G07F 7/08*    (2006.01)

(52) U.S. Cl.
  CPC ........... *G06F 3/0604* (2013.01); *G06F 3/0632* (2013.01); *G06F 3/0679* (2013.01); *G06Q 20/341* (2013.01); *G07F 7/082* (2013.01)

(58) Field of Classification Search
  CPC ...................................................... G06F 1/10
  See application file for complete search history.

(56) References Cited

U.S. PATENT DOCUMENTS

| 8,406,033 | B2 * | 3/2013 | Lung ............ | G11C 13/0004 365/148 |
| 8,649,212 | B2 * | 2/2014 | Kau ............... | G11C 13/0004 365/158 |
| 8,717,809 | B2 * | 5/2014 | Hurkx ............ | G11C 13/0069 365/148 |
| 2003/0236996 | A1 * | 12/2003 | Himmel ....... | G06F 21/6218 726/30 |
| 2005/0135411 | A1 | 6/2005 | Sureaud | |
| 2008/0077759 | A1 * | 3/2008 | Goedecke ..... | G06F 12/1458 711/163 |

(Continued)

FOREIGN PATENT DOCUMENTS

WO    2010010519 A1    1/2010

OTHER PUBLICATIONS

Oosthoek et al. "Evolution of Cell Resistance, Threshold Voltage and Crystallization Temperature During Cycling of Line-Cell Phase-Change Random Access Memory" Journal of Applied Physics, 110, 024505, (2011), 11 pages.

(Continued)

*Primary Examiner* — Mohammed Rehman

(57) ABSTRACT

A time manager controls one or more timing functions on a circuit. The time manager includes a data storage and a time calculator. The data storage device stores a first indication of a performance characteristic of a memory cell at a first time. The data storage device also stores a second indication of the performance characteristic of the memory cell at a second time. The time calculator is coupled to the data storage device. The time calculator calculates a time duration between the first time and the second time based on a change in the performance characteristic of the memory cell from the first indication to the second indication.

9 Claims, 4 Drawing Sheets

(56) References Cited

U.S. PATENT DOCUMENTS

| | | | |
|---|---|---|---|
| 2008/0137246 A1* | 6/2008 | Oda | H02H 3/30 361/64 |
| 2009/0127537 A1 | 5/2009 | Jedema et al. | |
| 2010/0027334 A1 | 2/2010 | La Rosa | |
| 2010/0044665 A1 | 2/2010 | Jedema | |
| 2010/0301896 A1 | 12/2010 | Nirschl et al. | |
| 2010/0329034 A1 | 12/2010 | Bryant-Rich | |
| 2011/0010761 A1* | 1/2011 | Doyle | G06F 21/6218 726/5 |
| 2011/0012080 A1* | 1/2011 | Schell | C22C 12/00 257/2 |
| 2011/0031462 A1 | 2/2011 | Jedema et al. | |
| 2011/0122684 A1 | 5/2011 | Sheu et al. | |
| 2012/0246353 A1* | 9/2012 | Lim | G06F 13/28 710/22 |
| 2013/0163321 A1 | 6/2013 | Lam et al. | |
| 2013/0272063 A1* | 10/2013 | Bedeschi | G11C 11/5678 365/163 |

OTHER PUBLICATIONS

Jedema et al. "Program Window of Doped Sb2Te Phase Change Line Cells" Applied Physics Letters 91, 203509, (2007), 3 pages.

Karpov et al. "Fundamental Drift of Parameters in Chalcogenide Phase Change Memory" American Insitute of Physics, Journal of Applied Physics, (2007), 6 pages.

Ielmini, D. et al.; "Physical Interpretation, modeling and impact on phase change memory (PCM) reliability of redsistance drift due to chalcogenide structural relaxation"; IEEE international Electron Devices meeting; pp. 939-942; Dec. 10, 2007.

Jing, Li et al.; "Resistance drift in phase change memory"; Reliability Physics Symposium (IRPS), pp. 6C.1.1-6C.1.6; Apr. 15, 2012.

European Search Report, 15167471.0, Oct. 9, 2015.

* cited by examiner

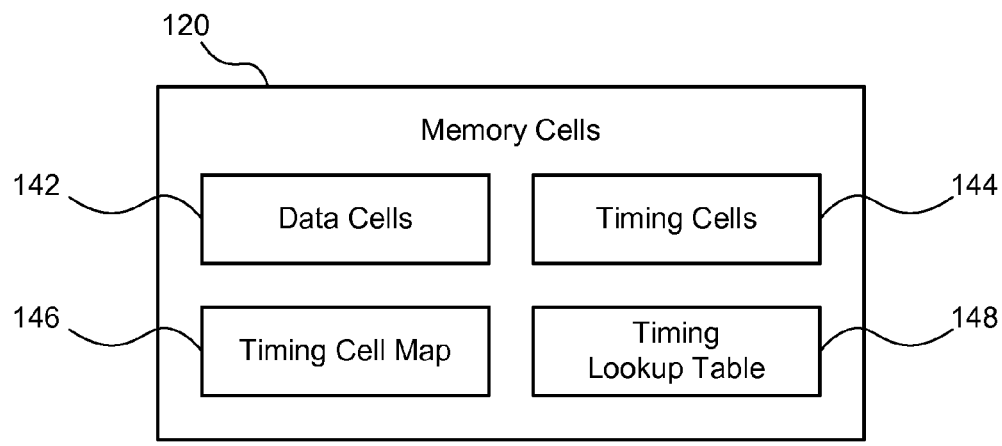
FIG. 3
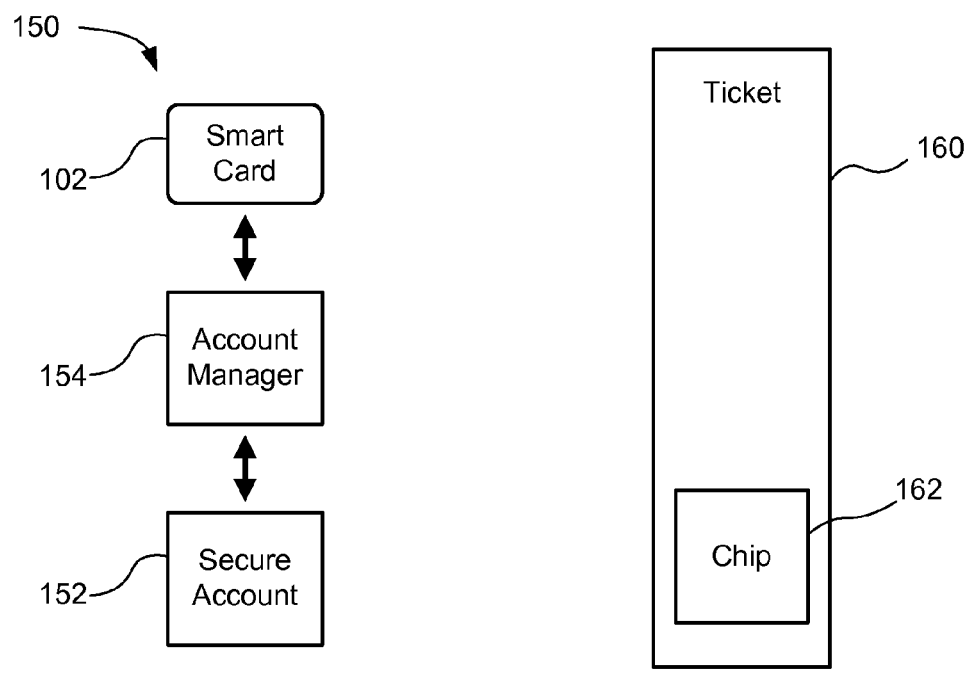
FIG. 4
FIG. 5

TIME MANAGEMENT USING TIME-DEPENDENT CHANGES TO MEMORY

Time measurement is important for many electronic devices. Many electronic devices operate using a regular clock signal. Many functions of electronic devices also rely on timing signals to indicate how long of a time lapses between two events.

Electronic devices typically require continual power in order to maintain a regular clock signal. Conventional devices utilize power from an external source or power from a battery or other internal device to supply power to timing circuitry. Once powered down, most electronic devices cannot keep track of time because the internal clock is not available.

One conventional solution records a digital time stamp on the device before power down. When powered up again, this time stamp can be compared with a trusted external clock service (possibly from the internet) that provides the current date and time via a secure (cryptographic) communication protocol. While this method can be used to calculate a time duration, this method can introduce security vulnerabilities for some applications. In particular, the server side may be unavailable to provide a current time stamp. Alternatively, the server side may be compromised. In addition, this conventional method introduces hardware and software overhead on the electronic device and thus extra cost.

Embodiments of a time manager are disclosed. In one embodiment, the time manager controls one or more timing functions on a circuit. An embodiment of the time manager includes a data storage device and a time calculator. The data storage device stores a first indication of a performance characteristic of a memory cell at a first time. The data storage device also stores a second indication of the performance characteristic of the memory cell at a second time. The time calculator is coupled to the data storage device. The time calculator calculates a time duration between the first time and the second time based on a change in the performance characteristic of the memory cell from the first indication to the second indication. Other embodiments of the time manager and corresponding system are also described.

Embodiments of an integrated circuit are also disclosed. In one embodiment, the integrated circuit is used in a smart card or other portable device. An embodiment of the integrated circuit includes a power interface to introduce electrical power to the integrated circuit. The integrated circuit also includes memory cells to store data signals. The integrated circuit also includes time management logic coupled to the memory cells. The time management logic is configured to determine a time lapse between a first state and a second state based on a change in a performance characteristic of at least one memory cell over a period comprising a power-down period. Other embodiments of the integrated circuit and corresponding system are also described.

Embodiments of a method are also described. In one embodiment, the method includes storing a first value on an electronic device. The first value is representative of a performance characteristic of a memory element before a power-down period of an electronic device. The method also includes obtaining a second value at the electronic device. The second value is representative of the performance characteristic of the memory element after the power-down period of the electronic device. The method also includes deriving a time duration at the electronic device. The time duration is inclusive of the power-down period. The time duration is derived from a difference between the first and second values. Other embodiments of the method are also described.

Other aspects in accordance with the invention will become apparent from the following detailed description, taken in conjunction with the accompanying drawings, illustrated by way of example of the principles of the invention.

FIG. 3 depicts a schematic block diagram of a more detailed embodiment of the memory cells of FIG. 2.

FIG. 4 depicts a schematic block diagram of one embodiment of an account access system.

FIG. 5 depicts a schematic block diagram of one embodiment of an event ticket with an embodiment of a semiconductor chip with time management functionality.

Throughout the description, similar reference numbers may be used to identify similar elements.

Figure 1:
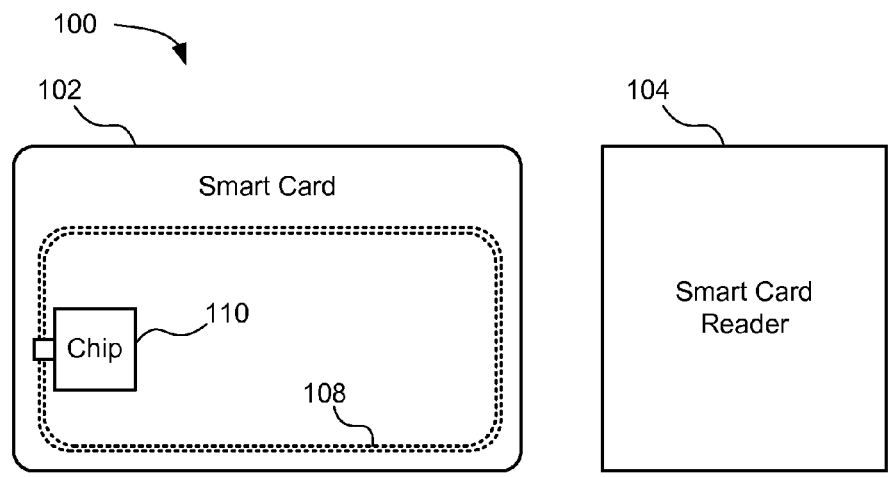
FIG. 1 depicts a schematic block diagram of one embodiment of a smart card system.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments enable time management functionality in an electronic device that has been through a period without an internal power source or a connection to an external power source. This allows the electronic device to keep track of time that has passed during the powered down state.

Embodiments of the time management functionality may be implemented in a number of different types of electronic devices. Some examples of electronic devices that might include this time management functionality include smart cards, contactless cards, subscriber identity module (SIM) cards, near field communication (NFC) tags, radio frequency identification (RFID) tags, and so forth. There is no limitation on the general types of electronic devices that might implement the technology described herein.

The ability to calculate how much time has passed during a powered down state of the electronic device, in the embodiments described herein, may be useful to provide increased levels of security and information tracking. For example, some embodiments can be used to increase the security level of the electronic device for those use cases where time monitoring is relevant. As one example, some embodiments may facilitate implementing a time-based temporal password lock out application for smart cards. As another example, some embodiments implement an expiry date functionality for ticketing. Other embodiments may facilitate additional security measures, data access measures, expiration timing measures, and so forth. There is no limitation on the general types of applications that might incorporate embodiments of the technology described herein.

In one embodiment, the element that enables a continuous time tracking for a period spanning a powered down state is a phase change memory (PCM) cell. The electrical resistance of the programmed amorphous state monotonically increases as a function of time. By monitoring the resistance values before and after the powered down state (or at any two points in time, regardless of a particular powered down state), and correlating the resistance values to other electrical properties such as voltage and/or current, the differences in resistance levels at two different times can be used to calculate a passage of time. This behavior can bridge a period of several months.

In the case of PCM, the change in cell resistivity over time is generally considered to be a degenerative effect that is undesirable. Embodiments described herein utilize this otherwise degenerative property in order to realize beneficial time management functionality. Other technologies similarly may exhibit time-dependent behavior that is considered degenerative, benign, or potentially beneficial for purposes other than time management. Utilizing such time-dependent behavior or properties for time management during a period that includes a powered down state may simplify hardware designs and/or simplify or even eliminate security concerns related to obtaining accurate time indications from external sources.

Although embodiments described herein refer specifically to PCM, other embodiments may be implemented to generally monitor and use other time-dependent properties of a memory device in order to estimate a passage of time based on a change in the property or properties of the memory device.

FIG. 1 depicts a schematic block diagram of one embodiment of a smart card system 100. The illustrated smart card system 100 includes a smart card 102 and a smart card reader 104. In general, the smart card 102 stores digital information that can be transmitted to and read by the smart card reader 104. In some embodiments, the smart card 102 is also able to store data that is transmitted from the smart card reader 104 to the smart card 102.

Although the illustrated smart card system 100 is shown with certain components and described herein with certain functionality, other embodiments of smart card systems may include a different number of components to implement the same or similar functionality. For example, other embodiments of the smart card system 100 may include multiple smart cards 102 and/or multiple smart card readers 104.

The illustrated smart card includes a communication interface 108 and a semiconductor chip 110. In general, the communication interface 108 may be any type of contact or contactless interface to facilitate transmission of data to the smart card reader 104 or reception of data from the smart card reader 104. In one embodiment, the smart card 102 is a contactless smart card, and the communication interface 108 is an antenna 108 to transmit wireless radio frequency (RF) signals to communicate data to the smart card reader 104. Although not shown in detail, embodiments of the smart card reader 104 may have corresponding hardware to enable the communications with the smart card 102 and optionally with other electronic devices.

Figure 2:
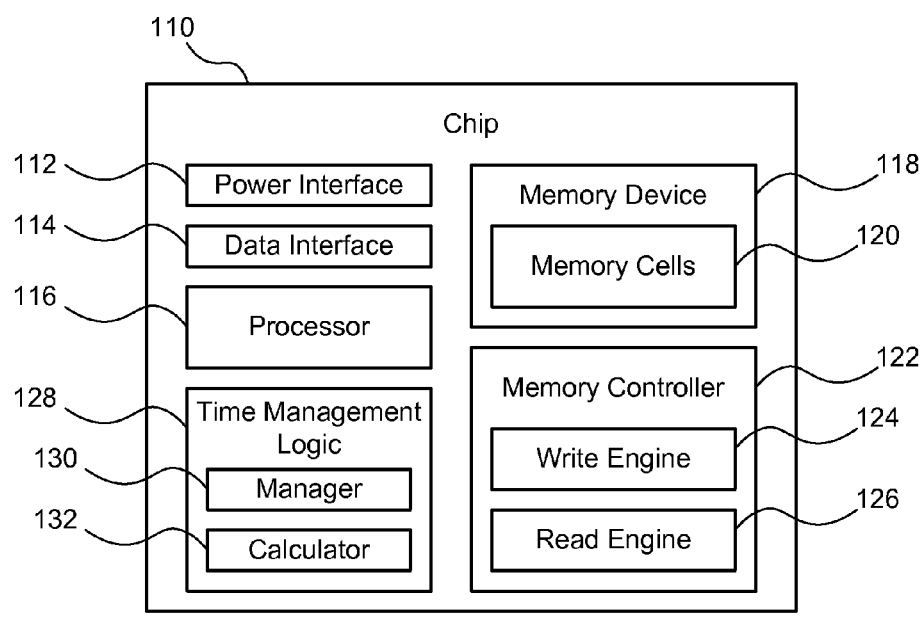
FIG. 2 depicts a schematic block diagram of a more detailed embodiment of the semiconductor chip of FIG. 1.

FIG. 2 depicts a schematic block diagram of a more detailed embodiment of the semiconductor chip 110 of FIG. 1. The illustrated semiconductor chip 110 includes a power interface 112, a data interface 114, and a data processing device (i.e., processor) 116. The illustrated semiconductor chip 110 also includes a memory device 118 with a plurality of memory cells 120. The semiconductor chip 110 also includes a memory controller 122 with a write engine 124 and a read engine 126 to interface with the memory device 118. The illustrated semiconductor chip 110 also includes time management logic 128 with a time manager 130 and a time calculator 132. Although the illustrated semiconductor chip 110 is shown with certain components and described with certain functionality herein, other embodiments of semiconductor chips and corresponding systems may include fewer or more components to implement the same, less, or more functionality.

In one embodiment, the power interface 112 acts as a connection through which power is transferred to other components of the chip 110. In contact chips that physically connect to an external power source, the power interface 112 may include one or more conductive terminals. In contactless chips that do not physically connect to an external power source, the power interface 112 may include an antenna (similar to or the same as the communication interface 108) to receive power through RF signals transmitted from the smart card reader 104 or another device. In some embodiments, contact chips and contactless chips may include an internal power source such as a battery or accumulator (or capacitor or inductor), which acts as the power interface 112 for the chip 110.

Both contact chips and contactless chips can have power down states. For contact-based devices that do not have an internal battery (or other internal power source), the devices are generally in a powered down state whenever there is not an RF power signal present at the device. During this powered down state, there is not a clock signal (or other timing signal) to keep track of time that passes during the powered down state. Thus, the device reestablishes a reference time upon receiving power after a period in the powered down state.

In one embodiment, the data interface 114 facilitates data communications with the smart card reader 104. The data interface 114 may be an antenna 108 for a contactless card (as shown in FIG. 1). Alternatively, the data interface 114 may be one or more contact terminals to physically couple to corresponding terminals at the smart card reader 104. In any case, the data interface 114 may facility communications for incoming data, outgoing data, or both. There is no limitation on the types of communication protocols that might be implemented for the data interface 114.

In some embodiments, the data interface 114 also may be the same physical structure as the power interface 112, in implementations where the power and data are both provided to the smart card 102 via one or more RF signals.

In general, the processor 116 is any type of data processing device or combination of data processing devices. The processor 116 executes instructions to cause the chip 110 to implement operations. In some embodiments, the processor 116 loads and executes an operating system that provides an interface for user interactions and/or system communications. The processor 116 also may load a file or other data structure management system to manage files or other data structures stored on the chip 110. In some embodiments, the processor 116 incorporates some or all of the time management logic 128. Embodiments of the chip 110 are not limited in the type of processor 116 and/or processing functions that can be performed by the processor 116.

The memory device 118 of the chip 110 may be any type of memory device that is capable of storing data (or states representative of data values). The memory device 118 includes a plurality of memory cells 120. The memory cells 120 may be arranged in any configuration. For example, in some embodiments, the memory cells 120 may be arranged in bytes and larger physical blocks or pages. The memory cells 120 also may be logically arranged in blocks or groupings corresponding to one or more of the physical blocks or groupings.

At least some of the embodiments described herein implement memory cells 120 that have a time-dependent characteristic that can be monitored and measured. One type of memory technology that exhibits a time-dependent characteristic is phase change memory (PCM, also referred to by various other similar names and acronyms, including PCRAM). PCM cells can be programmed to an amorphous state in which the electrical resistivity changes measurably over time. This change in the electrical resistivity can be correlated to a change in time in a relatively accurate manner.

More specifically, when a PCM cell is programmed into its amorphous state at time $t=t_0$, the PCM cell exhibits an initial resistance, $R(t_0)$, which evolves in time according to the below formula:

$$R(t)=R(t_0)(t/t_0)^\alpha$$

In one embodiment using this formula, $\alpha$ is a number between 0.03 and 0.1, and $R(t_0)=10$ M$\Omega$. For a maximum duration of about $t=10^7$ seconds (which is the equivalent of a few months), the resistance $R(t)$ will increase from the initial resistance $R(t_0)$ at most with a factor 5. In this example, the signal range corresponds to a resistance range from 10 M$\Omega$ to 50 M$\Omega$. Other embodiments may exhibit other resistance values.

The minimal expected noise is the thermodynamic Johnson-Nyquist noise which is at room temperature about 1 $\mu$N per $\sqrt{\text{Hz}}$ bandwidth. As the minimal output noise of a measurement circuit (operational amplifier) is about 7 nV/$\sqrt{\text{Hz}}$, the noise will be limited by the resistor itself.

Using a current source to deliver a current of 102 nA will result in a voltage of about 1 Volt across the resistor terminals. Hence, in some embodiments, a resistance readout can be achieved with an accuracy of about 1 $\mu$N/1 Volt=$10^{-6}$ for a bandwidth of 1 Hz. This implementation results in a timing accuracy of about 10 seconds.

The amorphous state resistance is not only a function of time t, but is also exponentially dependent on the temperature, according to the following formula:

$$R(T)=R(t_0)\exp(E_A/kT)$$

In this formula, $E_A$ is an activation energy, k the Boltzmann constant, and T the temperature. In some embodiments, this temperature dependency is filtered out. One way to facilitate filtering out the temperature dependency is to include a temperature sensor with the surrounding circuitry. One possible candidate for implementation is a proportional-to-absolute-temperature (PTAT) sensor. A typical PTAT sensor may have a temperature accuracy of for example 0.1° C. This level of accuracy of the temperature sensor may affect the resistivity accuracy (e.g., to a relative resistance change variation of $10^{-5}$). Hence, the timing accuracy may be lowered, in this example, by a factor of 10 to around 102 seconds.

In one embodiment, the memory controller 122 is controlled by the processor 116 to write data to the memory cells 120 and to read data from the memory cells 120. In particular, the illustrated memory controller 122 includes a write engine 124 to perform operations to write data or program memory cells 120 with states that are representative of one or more data values. Similarly, the illustrated memory controller 122 includes a read engine 126 to read data, or retrieve characteristics about the states of memory cells 120. The programmed states of the memory cells 120 may be correlated to bit values (or other digital values) by the processor 116 or other digital processing components within the chip 110. The specific manner in which the write engine 124 and the read engine 126 interact with the memory cells (e.g., by applying voltages or other programming inputs and controlling the flow of inputs to and outputs from the memory device 118) depends on the type of memory cells 120 that are employed. For known memory cell technologies, there are known writing, reading, and erasing protocols.

Some or all of the time management logic 128 may be implemented internally to the processor 116. Alternatively, some or all of the time management logic 128 may be implemented within the memory controller 122 or another component of the chip 110.

The time management logic 128 is circuitry or componentry generally directed to determining time durations over periods that include a time when the chip 110 was in a powered-down state. The illustrated time management logic includes a time manager 130 and a time calculator 132. In some embodiments, the processor 116 invokes the time management logic 128 to record values representative of characteristics of one or more memory cells 120 at various times. The processor 116 then invokes the time management logic 128 to calculate a time duration corresponding to the difference between two of the recorded values.

For example, the time manager 130 may record resistance values for a memory cell 120 at a first time (e.g., prior to a powered-down state) and at a second time (e.g., upon powering up after the powered-down state). The time calculator 132 then determines a difference between the recorded resistance values. The time manager 130 then uses that calculated difference to determine the time duration between the first and second times. In other words, the time manager 130 uses the difference in resistance values before and after the powered-down state to determine a time that estimates the time lapse corresponding to the powered-down state.

Although the previous example uses resistance values of the memory cells 120, other embodiments may use other time-dependent characteristics of the memory cells 120. The type of values that are stored by the time manager 130 and the corresponding calculations performed by the time calculator 132 may depend on the type of technology that implements the memory cells 120 within the memory device 118.

The presence of one or more time-dependent properties on a memory cell makes possible a timing measurement for a time period that includes the powered down state. In PCM cells specifically, there is an upwards drifting of the electrical resistance of the phase change material in the programmed amorphous state of the memory cell. From a memory reliability perspective, this property is not typically desirable. However, from a time management perspective and embodiments of applications described herein such as security improvements, this property has significant value.

In further embodiments, it also may be possible to utilize two separate time-dependent properties of the same memory cell and calculate separate time durations based on each type of property. Those separate calculations then may be merged through averaging or some other mathematical operation to determine a time that might be statistically more accurate than either individual time separately.

In a similar manner, in some embodiments it may be possible to measure time-dependent properties for two or more cells, and calculate separate time durations based on each memory cell. Those separate calculations for the different memory cells then may be merged or combined using mathematical operations.

In further embodiments, the time manager 130 may track time durations based on particular memory cells during periods when the electronic device is powered on. Those calculated times may be compared with clock times to determine if there is an identifiable relationship (e.g., a leading or lagging offset) between a particular memory cell and the system clock signal.

FIG. 3 depicts a schematic block diagram of a more detailed embodiment of the memory cells 120 of FIG. 2. The illustrated memory cells 120 show various types of content that may be stored in the memory cells 120 and/or functions for which the memory cells 120 may be used. Other embodiments of the memory cells 120 may store other types of content and/or be allocated for other uses.

In particular, the illustrated memory cells 120 include data cells 142 to store data content for later retrieval. The illustrated memory cells 120 also include timing cells 144 which may be programmed for use in timing management and calculations, even though the specific content stored in the timing cells 144 may be without additional meaning.

The illustrated memory cells 120 also include a timing cell map 146 to store indications of which cells are in use or allocated for use as the timing cells 144. The illustrated memory cells 120 also include a timing lookup table 148 to provide a correspondence between the time values and the calculated values of the time-dependent properties. For example, the timing lookup table 148 may store time duration values that can be looked up with an input resistance value (or a difference between two resistance values).

FIG. 4 depicts a schematic block diagram of one embodiment of an account access system 150 with an embodiment of a semiconductor chip with time management functionality. In some embodiments, the time management functionality is implemented to improve security measures on an electronic device such as the SIM card 150.

In some embodiments, the security level of an electronic device would increase (compared with conventional devices) if the device could verify the time locally, i.e., on the device itself, by measuring the time that has passed since the device was powered down. Using PCM cells, this is possible by measuring the change in resistivity over time and correlating that change to a time duration, as described above. Such a local PCM cell and method can be used to measure the time that has passed since last power down up to a duration of about $10^7$ seconds (i.e., several months). For other types of memory cell technology, other types of time-dependent properties could be monitored, measured, and correlated to a time duration.

One example of improved security functionality includes temporal password lockout operations. In the illustrated embodiment of an account access system 150, a smart card 102 may be used to access a secure account 152. This type of general password lockout process is known and used in many financial institutions and other types of scenarios where users utilize smart cards to access private accounts. In order to access the secure account 152 using the smart card 102, an account manager 154 verifies the authorization of the smart card. This authorization may be verified by requesting a separate passcode (e.g., a key or a personal identification number (PIN)) from the user. If the user enters the correct PIN, then the account manager 154 grants access to the user of the smart card 102. Otherwise, if the user enters an incorrect PIN then the account manager 154 denies access to the user.

In some conventional implementations, the user is able to make repeated attempts to enter the correct PIN to gain access to the secure account 152. This introduces the possibility of an unauthorized access if a malicious user is able to keep trying different PINs until access is granted. Consequently, some conventional account access systems 150 implement security measures to limit the number of attempts that a user may make. If the attempt limits is exceeded, then the account may be disabled temporarily or permanently.

For networked devices like personal computers, the lockout or disabling functionality is often simple. The server (which is inaccessible to a malicious user) can simply temporarily (e.g., 5 minutes) lock out the user when the wrong password is used one or more times. Such a temporary lock-out mechanism is only possible if the device that performs the (password/key) verification has a known relative time since the last attempt.

For clockless devices like smart cards, this is normally not possible. Although a powered smart card could stop accepting keys/passwords for a certain number of clock cycles, in some circumstances it is possible for a hacker or malicious user to bypass this security measure. For example, the hacker might simply reset the device to clear the attempt history and then proceed with the next attempt. This type of conventional smart card has no internal functionality to determine the time interval since the last power-on moment.

In view of the inability to internally track time over a reset period of a smart card, some conventional systems rely on counting the number of wrong attempts. When the counter is too high, the smart card completely disables itself and becomes useless, also for the owner. This is a common approach for bank cards or SIM cards that typically become completely useless after 3 wrong PIN codes are entered.

In contrast to conventional approaches, embodiments described herein that utilize PCM cells or other memory cells with time-dependent characteristics can provide a time reference over reset periods or powered down states of the smart card. Thus, the ability to track or estimate the passage of time internally enables a temporal password lockout, instead of just a counter lockout. Embodiments of this approach can a block brute-force attacks, without having to make a device unusable (end-of-life).

FIG. 5 depicts a schematic block diagram of one embodiment of an event ticket 160 with an embodiment of a semiconductor chip 162 with time management functionality. The ticket may be any type of event or activity ticket such as a public transportation ticket, a discount coupon, or any other type of ticket or tag that might have an expiration time. By incorporating time-dependent memory cells such as PCM cells into the chip 162 on the ticket 160, a ticket reading system could verify expiration of the ticket.

In some embodiments, the expiration may be a time duration relative to the date of manufacture of the ticket 160 and the chip 162. In other embodiments, the expiration may be relative to an issuance date or a date of first use of the ticket, in which case the timing cells within the chip 162 may be set at the time of the starting event. In this manner, an electronic ticket could verify its own expiry date. Additionally, this type of internal time management within the ticket 160 itself may excludes the need for a reliable and secure reference time in the backend system and installed reader base or from another external source. This also may allow cost savings in the reader base, as well as ticket itself.

Figure 6:
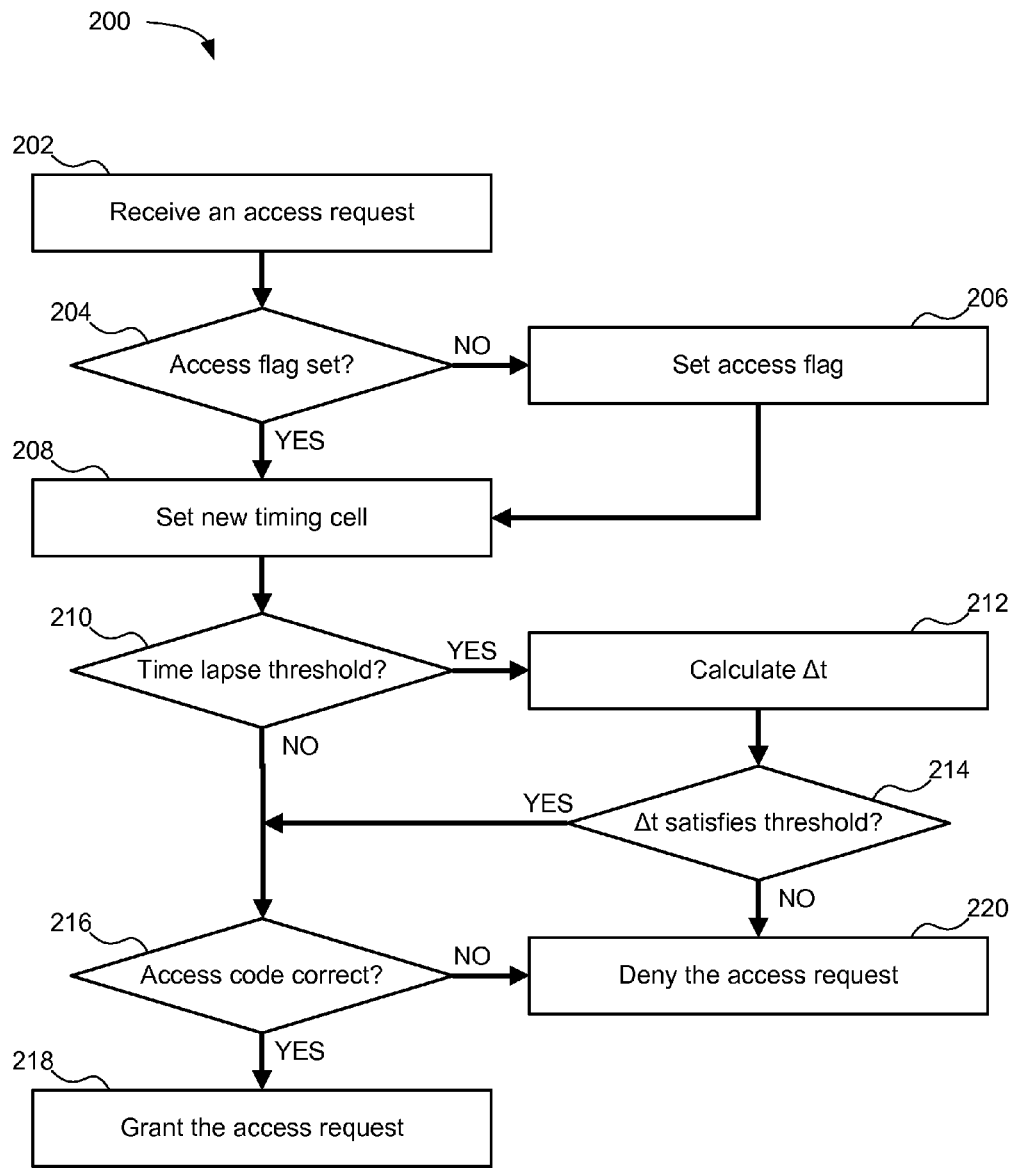
FIG. 6 depicts a flowchart diagram of one embodiment of a method for time management during a powered off period of an electronic memory device.

FIG. 6 depicts a flowchart diagram of one embodiment of a method 200 for time management during a powered off period of an electronic memory device. The illustrated method 200 is described with reference to the smart card 102 and the smart card system 100 of FIG. 1. However, embodiments of the method 200 may be implemented with other smart cards, smart card systems, or other devices which incorporate memory cells with time-dependent properties during a powered-down state.

The depicted method 200 begins when the smart card 102 receives 202 an access request or other initiation event to start a timing period. The smart card 102 then determines 204 if an access flag is already set. In some embodiments, the access flag indicates when an access request is received. If the access flag is not already set, then the smart card 102 sets 206 the access flag. Otherwise, if the access flag is already set, then there is no need to change the status of the access flag.

After setting the access flag or confirming that the access flag is already set, the smart card 102 sets 208 a new timing cell 144. This may be accomplished by the write engine 124 programming one or more of the timing cells 144 within the memory device 118. Alternatively, in some embodiments, the smart card 102 may forego setting a new timing cell 144 and, instead, identify an existing timing cell 144 or even and existing data cell 142, or multiple cells of any kind within the memory device 118.

Figure 7:
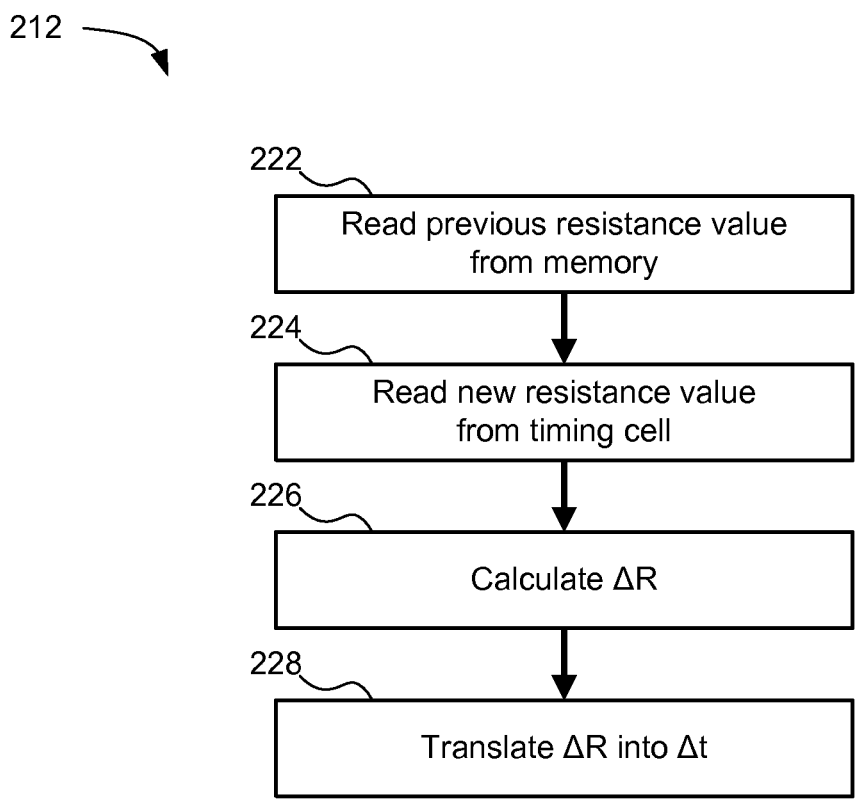
FIG. 7 depicts a flowchart diagram of one embodiment of a method for calculating a time duration.

The smart card 102 then determines 210 if a timing threshold has been established. If a timing threshold has been established, then the smart card 102 proceeds to calculate 212 the change in time, Δt, since the last access request. A more detailed example of operations that may be implemented to calculate 212 the change in time are shown in FIG. 7 and described in more detail below. After calculating the change in time, the smart card 102 determines 214 if the change in time satisfies the time lapse threshold.

If the change in time satisfies the time lapse threshold, of if there is no time lapse threshold established, then the smart card 102 proceeds to determine 216 if the access code provided with, or in connection with, the access request is correct. If the access code is correct, then the smart card 102 grants 218 the access request. Otherwise, if the access code is incorrect, or if the calculated change in time does not satisfy the time lapse threshold, then the smart card 102 denies 220 the access request. After granting or denying the access request, the depicted method 200 then ends.

Although this method addresses an access request to data stored on the smart card 102, other similar methods may be implemented to check expiry dates of a chip 110, for example by comparing the calculated change in time to an expiry time duration stored on the smart card 102. In alternative embodiments, the expiry time duration may be transmitted to the smart card 102 as part of a communication related to a particular smart card reader 104 or other criteria.

FIG. 7 depicts a flowchart diagram of one embodiment of a method 212 for calculating a time duration. This method 212 relates to PCM cells or other memory cells that exhibit a time-dependent change in resistance values. Other similar methods may be used for other types of time-dependent properties.

The illustrated method 212 begins as the smart card 102 reads 222 a previous resistance value of a timing cell 144. The previous resistance value may be stored in one of the data cells 142 or in another location accessible to the time management logic 128. The smart card then reads 224 a new resistance value for the same timing cell 144. Reading the new resistance value may include determining the resistance value at approximately the time of the access request. In this manner, reading or obtaining the new resistance value from the timing cell 144 is different from reading or retrieving the previous resistance value from a storage location in the memory device 118.

After both the previous resistance value and the new resistance value are known, the timing calculator 132 then calculates the change in resistivity, ΔR, between the previous and new values. The timing calculator 132 uses this change in resistivity to find the corresponding change in time from the time when the previous resistance value was obtained until the time when the new resistance value was obtained. The depicted method 212 then ends.

It also may be noted that changes in temperature may impact the measured resistance values of a timing cell 144. Although the electrical resistance of the amorphous PCM cells is temperature sensitive, the aging effect is not. Therefore, the aging effect can be used for time management functionality as described herein, without the need of continuous temperature measurements, i.e., in between start and final read out. This would also not be possible in contactless cards that are in the powered-down state, as the power is not continuously available in a smart card application.

In general, the "aging" of the PCM cells in the amorphous state is not dependent on the temperature, at least for temperatures sufficient below the phase change transition temperature (Tc) of around 150° C. This property is used to construct a powerless clock. The reason for this independence is that the aging effect is originating from the structural properties of the amorphous PCM cells, that is the re-arrangement of the position of the atoms within the amorphous state. The constant alpha in the power law describing this phenomenon depends only on material constants.

In some embodiments, a dependence on temperature of the aging effect may be observed. But this observed dependence is very small: a factor of about 1.5 over a temperature range of 50° C. The term "small" as used herein as opposed to an exponential dependency, which based on usual activation energies of ~1 eV, would have resulted in several orders of magnitude of resistance change over a temperature range of 50° C.

For at least some of the applications mentioned herein, the temperature dependence of the upwards drifting of the electrical resistance of the amorphous phase change material is small. It would reduce the timing accuracy of total elapsed time with about a factor of about 1.5, accelerating the wait time for a legitimate or malicious user. For example, the wait time may decrease from about 15 minutes, to only about 10 minutes.

The magnitude of the amorphous state resistance can be reversibly changed by the temperature, for temperatures sufficiently below the phase change transition temperature (Tc) of around 150° C. This temperature dependency has an electronic origin, i.e., a charge carrier density increase due to a larger kT. This effect is therefore decoupled from the aging effect (the re-arrangement of atoms, i.e., a structural origin). However, in at least some embodiments, this reversible dependence may make it necessary to record the temperature as well, when a read out of the amorphous resistance is performed, in which case the chip 110 also may have a temperature sensor.

For temperatures sufficiently close to Tc, the amorphous PCM cells will start to crystallize due to the re-arrangement of the atoms to their crystalline state, aided by the increased thermal energy. Note that this again is a structural effect, and therefore an irreversible process.

In some embodiments, a beam of high energy electrons (102 keV), as used in Transmission Electron Microscopy (TEM), is able to heat the PCM cells. The same thing could happen for X-rays, but then the X-ray tool would be used as a rather expensive heater.

As another area of potential concern, an attacker could possibly accelerate the "PCRAM clock" by cooling the device, directly after programming. Note that by cooling the amorphous state resistance increases, and an aging effect can be faked. However, as the IC temperature is measured at programming, provisions can be made to counter such an attack. That would only leave an attack strategy to manipulate the temperature locally, either by cooling only the PCRAM device on the IC or by heating the temperature sensor only. A solution to mitigate this vulnerability is to position PCM cells right on top of or in very close proximity to the temperature sensor. This can be done, in one embodiment, because the PCM elements may be processed in the first metal layer, whereas the temperature sensor may be processed directly in the Si substrate.

Embodiments described herein may include at least one memory controller coupled directly or indirectly to memory elements through a system bus such as a data, address, and/or control bus. The memory elements can include local memory employed during actual execution of program code, bulk storage, and cache memories which provide temporary storage of at least some program code in order to reduce the number of times code must be retrieved from bulk storage during execution.

It should also be noted that at least some of the operations for the methods described herein may be implemented using software instructions stored on a computer useable storage medium for execution by a computer. As an example, an embodiment of a computer program product includes a computer useable storage medium to store a computer readable program that, when executed on a computer, causes the computer to perform operations as described herein.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. An integrated circuit for a smart card, the integrated circuit comprising:
   a power interface to introduce electrical power to the integrated circuit;
   memory cells to store data signals;
   a write engine coupled to the memory cells, wherein the write engine is configured to write a first indication that indicates a characteristic of a first memory cell before a power-down period to a second memory cell and to write a second indication that indicates the characteristic of the first memory cell after the power-down period to a third memory cell;
   a read engine coupled to the memory cells, wherein the read engine is configured to read the second memory cell and to read the third memory cell; and
   time management logic coupled to the memory cells, wherein the time management logic is configured to determine a time lapse based on a change between the first indication read from the second memory cell and the second indication read from the third memory cell.

2. The integrated circuit of claim 1, wherein the memory cells comprises phase change random access memory (PCRAM).

3. The integrated circuit of claim 1, wherein the read property comprises a resistance of the at least one memory cell.

4. The integrated circuit of claim 1, wherein the time management logic is further configured to compare first and second states of a plurality of the memory cells, and determine the time lapse based on a mathematical combination of changes in performance characteristics of the plurality of the memory cells.

5. The integrated circuit of claim 1, wherein the time management logic is further configured to mathematically derive an overall time duration based on the plurality of preliminary time durations.

6. A method comprising:
   storing a first value on an electronic device, wherein the first value is representative of a performance characteristic of a memory element before a power-down period of an electronic device;

obtaining a second value at the electronic device, wherein the second value is representative of the performance characteristic of the memory element after the power-down period of the electronic device; and deriving a time duration at the electronic device, wherein the time duration is derived based on a difference between the first and second values and corresponds to the power-down period wherein obtaining the first and second values comprises obtaining first and second resistance values of the memory elements;

wherein deriving the time duration comprises finding a change in the resistance values from the first resistance value to the second resistance value; and wherein the time duration is derived based on the change in the resistance value.

7. The method of claim 6, further comprising comparing the derived time duration to a time threshold.

8. The method of claim 7, further comprising granting access to a component of the electronic device in response to a determination that the derived time duration exceeds the time threshold.

9. The method of claim 7, further comprising providing an expiration indication in response to a determination that the derived time duration exceeds the time threshold.

* * * * *